United States Patent
Bilhan et al.

(10) Patent No.: US 8,063,688 B2
(45) Date of Patent: Nov. 22, 2011

(54) AC CLAMP CIRCUIT FOR VIDEO APPLICATIONS

(75) Inventors: Haydar Bilhan, Dallas, TX (US); Maher Mahmoud Sarraj, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 43 days.

(21) Appl. No.: 12/691,428

(22) Filed: Jan. 21, 2010

(65) Prior Publication Data

US 2010/0182067 A1 Jul. 22, 2010

Related U.S. Application Data

(60) Provisional application No. 61/146,028, filed on Jan. 21, 2009.

(51) Int. Cl.
*H03L 5/00* (2006.01)
*H03K 5/08* (2006.01)

(52) U.S. Cl. .................. 327/310; 327/309; 327/311

(58) Field of Classification Search .............. 327/309, 327/310, 311
See application file for complete search history.

(56) References Cited

U.S. PATENT DOCUMENTS

| 4,017,749 A * | 4/1977 | Seki et al. | 327/311 |
| 5,027,017 A * | 6/1991 | Fling | 327/321 |

* cited by examiner

*Primary Examiner* — Lincoln Donovan
*Assistant Examiner* — John Poos
(74) *Attorney, Agent, or Firm* — Robert D. Marshall, Jr.; W. James Brady; Frederick J. Telecky, Jr.

(57) ABSTRACT

This invention is a clamp circuit for a video input. The clamp circuit includes: a coupling capacitor; a differential amplifier comparing a video input to predetermined reference voltage; a clamp transistor having a gate connected to the output terminal of the differential amplifier and a source-drain path connected between a power supply voltage and a second terminal; a resistive element connecting the second terminal of the clamp transistor and the coupling capacitor; a first current sink carrying a first predetermined current from the coupling capacitor to ground; and a second current sink carrying a second predetermined current from the second terminal of the said clamp transistor to ground. The resistive element can be a transistor, a resistor, a diode or a switch.

7 Claims, 4 Drawing Sheets

AC CLAMP CIRCUIT FOR VIDEO APPLICATIONS

CLAIM OF PRIORITY

This application claims priority under 35 U.S.C. 119(e)(1) to U.S. Provisional Application No. 61/146,028 filed Jan. 21, 2009.

TECHNICAL FIELD OF THE INVENTION

The technical field of this invention is a clamp circuit for video applications.

BACKGROUND OF THE INVENTION

Undesired leakage in output of trans-conductor amplifier of analog-video-clamp circuit causes artifacts in video signals.

SUMMARY OF THE INVENTION

This invention introduces reverse leakage current at a video-node. This causes the ordinary leakage current to be ineffective when input is low such as during the blanking period of video signal. During higher signals levels the ordinary leakage current will be modulated by the reverse leakage current.

This invention may use a higher reference voltage for the trans-conductor amplifier. This higher reference voltage will cause lower dynamic range. The invention preferably uses a process having low leakage which may increase cost. This invention enables use of a low-cost digital CMOS process with leaky transistor without performance trade-off.

BRIEF DESCRIPTION OF THE DRAWINGS

These and other aspects of this invention are illustrated in the drawings, in which.

DETAILED DESCRIPTION OF PREFERRED EMBODIMENTS

Analog video signals are applied to video processors through AC coupling capacitors. A video processing circuit first needs to restore the DC level to a known reference to put the video signal within its dynamic input range before this signal can be further processed.

Figure 1:
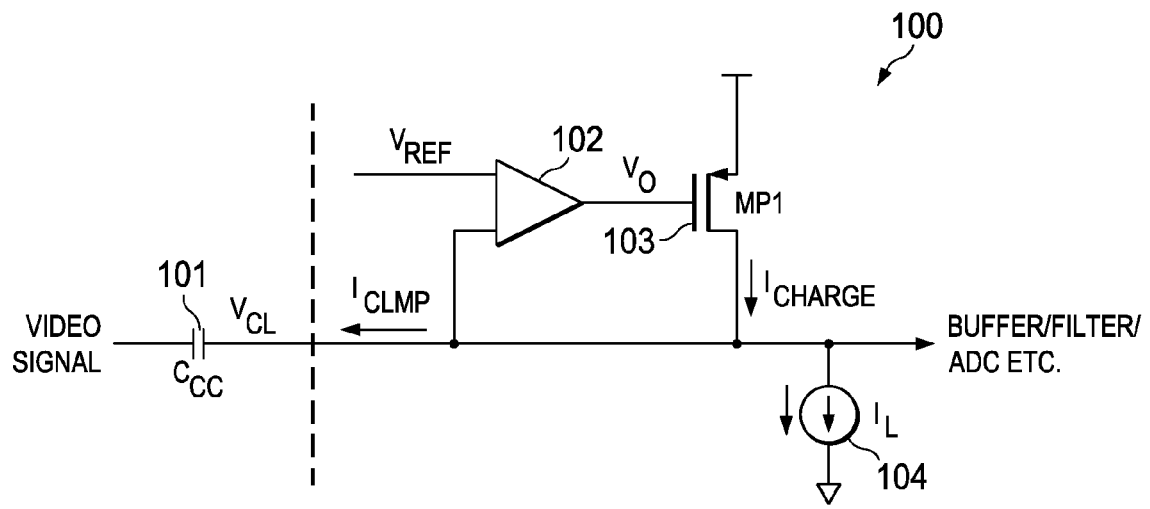
FIG. 1 illustrates a prior art bottom-level clamp circuit.

FIG. 1 illustrates a prior art bottom-level clamp circuit 100 used for this purpose. The input video signal is coupled to the clamp circuit via AC coupling capacitor 101. Amplifier 102 compares the video signal $V_{CL}$ following the AC coupling capacitor 101 with a clamp reference $V_{ref}$ and generates an output $V_O$ current proportional to the error voltage. This output $V_O$ is coupled to the gate electrode of charge transistor 103. Charge transistor 103 supplies a corresponding source-drain current $I_{charge}$ that is fed back to charge AC coupling capacitor 101 as $I_{clamp}$.

If the AC coupled input video signal $V_{CL}$ is below the clamp-reference $V_{ref}$ trans-conductance amplifier formed by amplifier 102 and charge transistor 103 generates an output $V_O$ current proportional to the error voltage at amplifier 102. If the signal is above the reference point, it is desirable to shut-off the charge current completely. Accordingly the trans-conductance amplifier formed by amplifier 102 and charge transistor 103 has a non-linear transfer function. Charge sink 104 carries a small intentional leakage current $I_L$ from the output node. This current $I_L$ pulls charge out of AC coupling capacitor 101 occurring due to any spike that may occur because of input noise, power-up transients etc.

Figure 2:
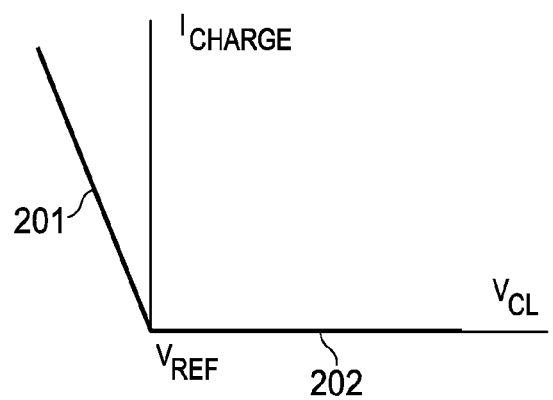
FIG. 2 illustrates the ideal non-linear transfer function for the trans-conductance amplifier of the prior art circuit of FIG. 1.

FIG. 2 illustrates the ideal non-linear transfer function for the trans-conductance amplifier formed by amplifier 102 and charge transistor 103. For an input voltage $V_{CL}$ below $V_{ref}$ the output is in linear region 201. In linear region 201 the output $I_{charge}$ is a function of the difference between $V_{CL}$ and $V_{ref}$. For an input voltage $V_{CL}$ above $V_{ref}$ the output is in clamp region 202. In clamp region 202 the output $I_{charge}$ is zero.

Using the ideal trans-conductance amplifier transfer function illustrated in FIG. 2 $V_{ref}$ should be zero to give maximum dynamic range. Because charge transistor 103 cannot turn off completely, the transition to zero charge current is soft. Leakage in a P-channel transistor such as charge transistor 103 as well as design challenges with the non-linear trans-conductor amplifiers results in an undesired leakage current. Even very small currents in order of 500 nA will cause artifacts in video signal causing the DC level to shift during blanking period. The current $I_L$ of current sink 104 will not help during the blanking period since there is no voltage headroom. Increasing $V_{ref}$ may be helpful but would also limit the dynamic range.

Figure 3:
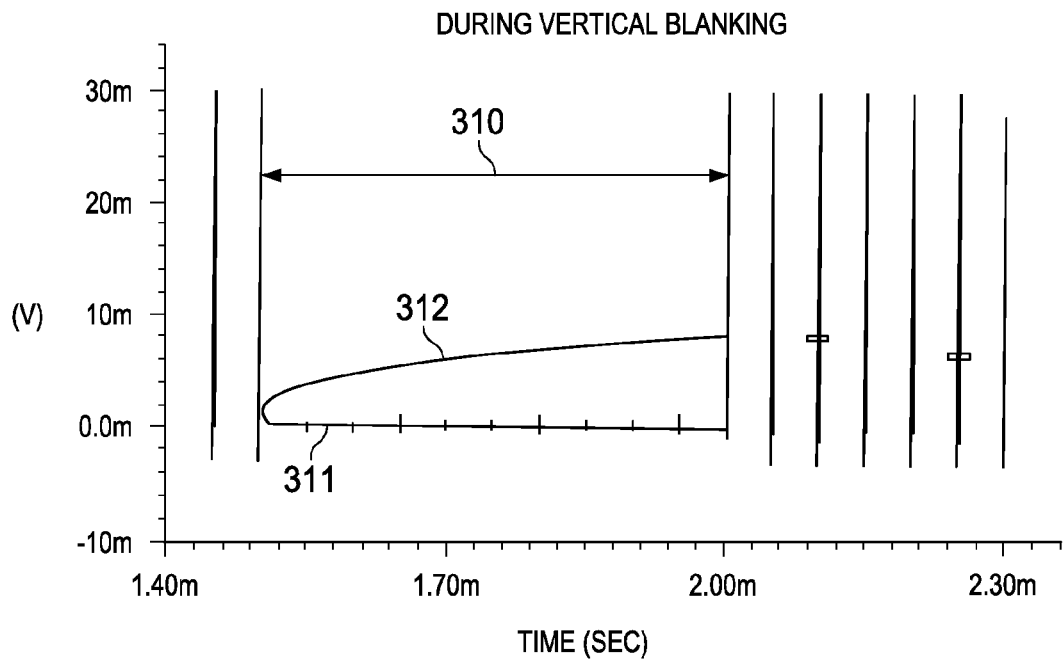
FIG. 3 illustrates a comparison between the ideal clamp signal and a spice simulation of the clamped signal from the prior art video clamp circuit during vertical blanking.
Figure 4:
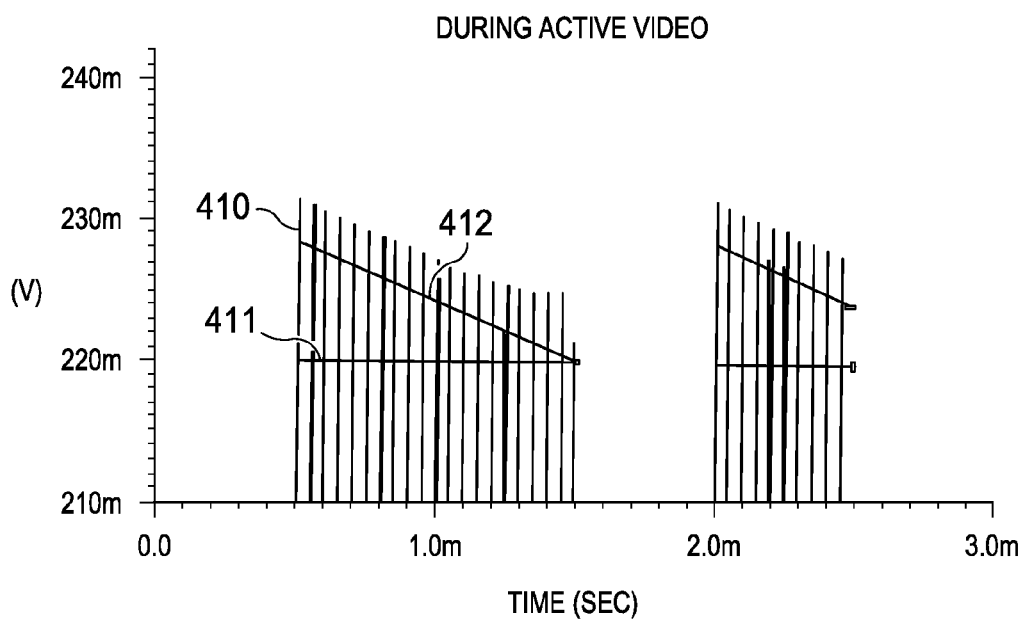
FIG. 4 illustrates a comparison between the ideal clamp signal and a spice simulation of the clamped signal from the prior art video clamp during active video.

FIGS. 3 and 4 illustrate results of the undesirable leakage current of the prior art. FIG. 3 illustrates a comparison between the ideal clamp signal from the transfer function of FIG. 2 and a spice simulation of the clamped signal from the prior art video clamp circuit of FIG. 1 during the vertical blanking interval. Vertical blanking occurs during interval 310. Signal 311 illustrates the response to the ideal clamp signal of the transfer function of FIG. 2. FIG. 3 illustrates that ideal clamp signal 311 remains near zero volts during blanking interval 310. Signal 312 illustrates a simulation of the response to the prior art circuit illustrated in FIG. 1. FIG. 3 illustrates that the simulated clamp signal 312 drifts upward in voltage during blanking interval 310. The leakage current of transistor 103 changes the voltage across AC coupling capacitor 101 causing this voltage drift.

FIG. 4 illustrates a comparison between the ideal clamp signal from the transfer function of FIG. 2 and a spice simulation of the clamped signal from the prior art video clamp circuit of FIG. 1 during the active video. FIG. 4 shows active line periods 410. FIG. 4 illustrates that ideal clamp signal 411 remains at a nearly constant voltage during active video interval 410. Signal 412 illustrates a simulation of the response to the prior art circuit illustrated in FIG. 1. FIG. 4 illustrates that the simulated clamp signal 412 drifts downward in voltage during the active video interval 410. The leakage current of transistor 103 changes the voltage across AC coupling capacitor 101 causing this voltage drift.

The time domain video signal artifacts that are caused by leakage in transistor 103 are shown in FIGS. 3 and 4. Increasing $I_L$ will cause signal dependent line-droop which is also undesirable. This will not help during blanking period.

Figure 5:
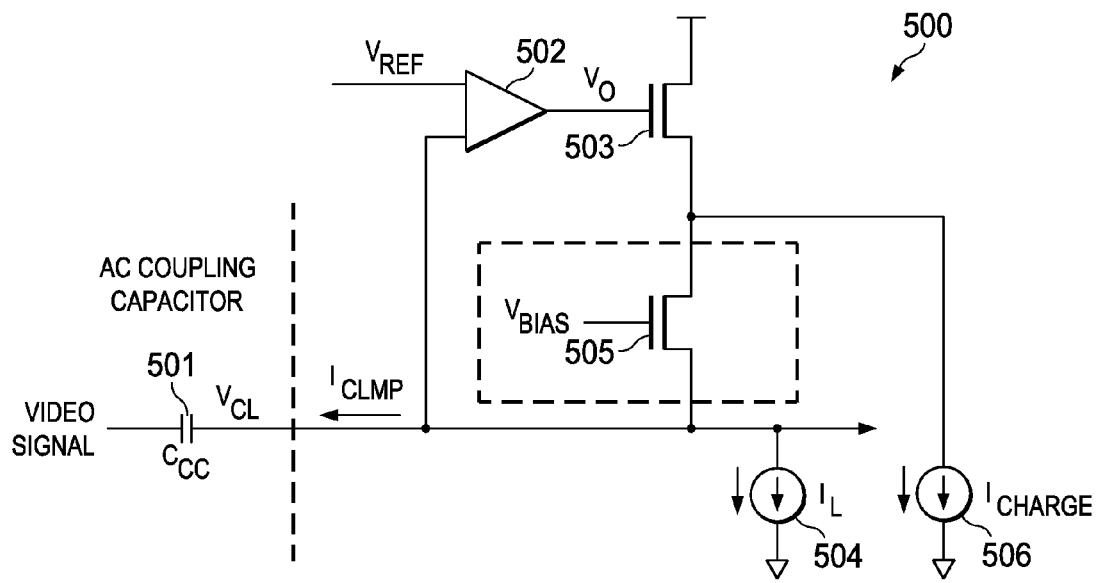
FIG. 5 illustrates the clamp circuit of this invention.

FIG. 5 illustrates the circuit of this invention. The circuit of FIG. 5 is an improvement over the circuit of FIG. 1. The input video signal is coupled to the clamp circuit via AC coupling capacitor 501. Amplifier 502 compares the video signal following the AC coupling capacitor $V_{CL}$, with a clamp reference $V_{ref}$ and generates an output $V_O$ current proportional to the error voltage. This output $V_O$ is coupled to the gate electrode of charge transistor 503. Charge transistor 503 supplies a corresponding source-drain current $I_{charge}$ that is fed back to charge the ac coupling capacitor as $I_{clamp}$. Charge sink 504 carries a small intentional leakage current $I_L$.

FIG. 5 further includes transistor 505 between clamp transistor 503 and the feedback terminal. Transistor 505 receives a gate bias voltage $V_{bias}$ causing it to act as a resistor and carry a predetermined current. Transistor 505 may be replaced by a diode, resistor or switch serving the same function. FIG. 5 also includes current sink 506 having a current of $I_{charge}$. Current sink 506 introducing an opposite leakage current to $I_{charge}$ at a cascade node that is isolated from the input $V_{CL}$ through transistor 505. The current $I_{charge}$ of current sink 506 is selected to saturate the undesirable cut-off process leakage of transistor 503. Transistor 505 isolates the current drawn by current sink 506 from the input $V_{CL}$. This invention also shifts $V_{ref}$ slightly introducing an offset to the linear portion of the trans-conductance amplifier while obtaining a very sharp transition point.

The current $I_{charge}$ of current sink 506 is selected corresponding to the leakage current of clamp transistor 503 when cut-off. Thus when clamp transistor 503 is cut-off no current will flow through clamp transistor 503 into AC coupling capacitor 501. The voltage $V_{bias}$ is selected to permit conducting the current when clamp transistor 503 is operating in region 201 of FIG. 2. If transistor 505 is replaced with a resistor it value is selected to permit carrying this current. If transistor 505 is replaced with a diode, this diode should conduct current from clamp transistor 503 to the node. The forward bias voltage of this diode prevents the leakage current of clamp transistor 503 from entering AC coupling capacitor 501. If transistor 505 is replaced by a switch, the switch should be closed to couple clamp transistor 503 to AC coupling capacitor 501 when operating in region 201 and open to isolate clamp transistor 503 from AC coupling capacitor 501 when operating in region 202.

Figure 6:
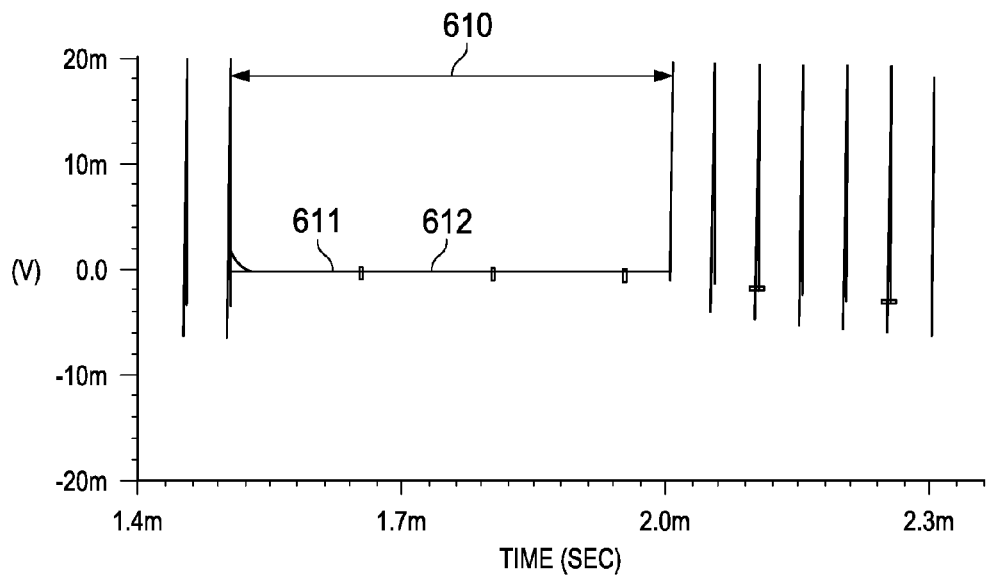
FIG. 6 illustrates a comparison between the ideal clamp signal and a spice simulation of the clamped signal from the video clamp circuit of this invention during vertical blanking.
Figure 7:
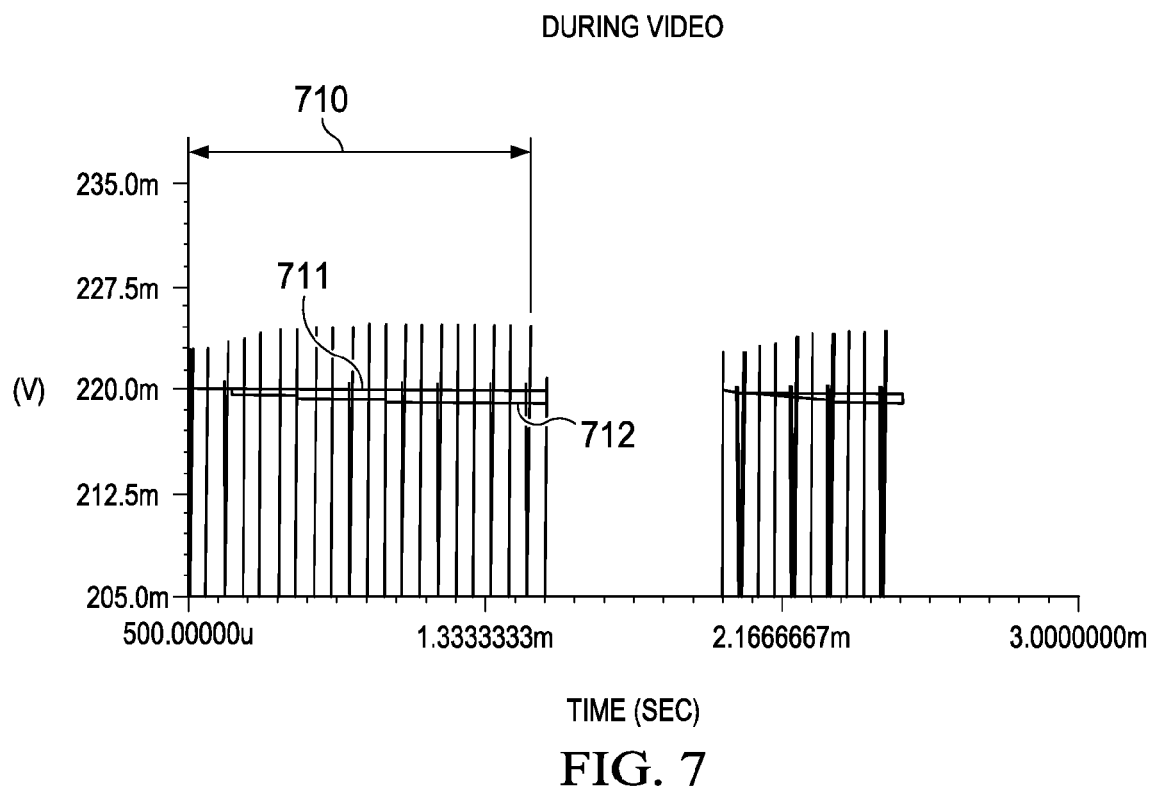
FIG. 7 illustrates a comparison between the ideal clamp signal and a spice simulation of the clamped signal from the video clamp circuit of this invention during active video.

FIGS. 6 and 7 illustrate the improvement of this invention. FIG. 6 shows the improvement of the invention over the prior art of FIG. 3. FIG. 6 illustrates a comparison between the output signal using an ideal clamping circuit and a simulation of the inventive circuit of FIG. 5. During vertical blanking interval 610, ideal clamped signal 611 and signal 612 clamped by the circuit in FIG. 5 are virtually identical. FIG. 7 shows the improvement of the invention over the prior art of FIG. 4. FIG. 7 shows active line periods 710. FIG. 7 illustrates that ideal clamp signal 711 remains at a nearly constant voltage during active video interval 710. Signal 712 illustrates a simulation of the response to the invention illustrated in FIG. 5. During active video period non-ideal overshoot is nearly eliminated. FIG. 7 illustrates that the simulated clamp signal 712 drifts downward in voltage during the active video interval 710 much less than shown in FIG. 4. This downward drift comes from the slight leakage current $I_L$ and is intentional and programmable.

Figure 8:
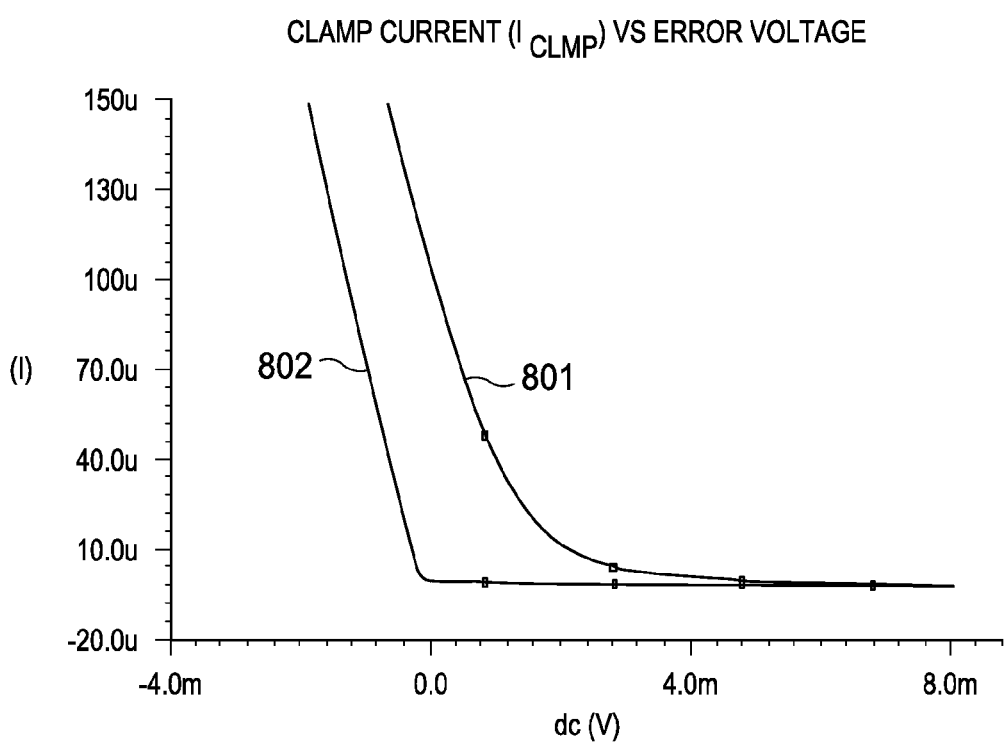
FIG. 8 compares the spice simulations of the transfer function of the trans-conductance amplifier of the prior art with that of the invention.

FIG. 8 compares the spice simulations of the transfer function of the trans-conductance amplifier of the prior art illustrated in FIG. 1 with that of the invention illustrated in FIG. 5. These transfer functions should be compared with the ideal transfer function shown in FIG. 2. Curve 801 is the transfer function of the prior art. Curve 802 is the transfer function of the invention. Curve 802 shows a sharper corner more nearly the ideal transfer function illustrated in FIG. 2 than the prior art curve 801. FIG. 8 illustrates a small offset shift between curves 802 and 801 due to the intentional leakage introduced to saturate undesired process leakage. This offset shift in curve 802 can be tolerated since it will be in order of few millivolts. Alternatively this offset shift may be compensated with an offset correction circuit since it will be static.

What is claimed is:

1. A clamp circuit for a video input comprising:
   a coupling capacitor having a first terminal receiving a video input an a second terminal;
   a differential amplifier having a first input terminal connected to said second terminal of said coupling capacitor, a second input terminal receiving a predetermined reference voltage and an output terminal generating a voltage signal proportional to a difference between a voltage on said first input terminal and a voltage on said second input terminal;
   a clamp transistor having a gate connected to said output terminal of said differential amplifier and a source-drain path having a first terminal connected to a power supply voltage and a second terminal;
   a resistive element having a first terminal connected to said second terminal of said source-drain path of said clamp transistor and a second terminal connected to said second terminal of said coupling capacitor;
   a first current sink having a first terminal connected to said second terminal of said coupling capacitor and a second terminal connected to ground, said current sink carrying a first predetermined current from said second terminal of said coupling capacitor to ground;
   a second current sink having a first terminal jointly connected to said second terminal of said source-drain path of said clamp transistor and to said first terminal of said resistive element, and a second terminal connected to ground, said second current sink carrying a second predetermined current from said second terminal of said source-drain path of said clamp transistor to ground; and
   a output terminal connected to said second terminal of said coupling capacitor.

2. The clamp circuit of claim 1, wherein:
   said first current sink has said first predetermined current selected to pulls charge out of said coupling capacitor occurring due to any spike from input noise or power-up transients.

3. The clamp circuit of claim 1, wherein:
   said resistive element comprises a transistor having a source-drain path connected between said first and second terminals and a base receiving a predetermined bias voltage.

4. The clamp circuit of claim 1, wherein:
   said resistive element comprises a resistor.

5. The clamp circuit of claim 1, wherein:
   said resistive element comprises a diode.

6. The clamp circuit of claim 1, wherein:
   said resistive element comprises a switch, said switch coupling said clamp transistor to said second terminal of said coupling capacitor when said clamp transistor is not cut-off and isolating said clamp transistor from said second terminal of said coupling capacitor when said clamp transistor is cut-off.

7. The clamp circuit of claim 1, wherein:
   said second current sink has said second predetermined current selected corresponding to a cut-off leakage current of said clamp transistor.

* * * * *